United States Patent
Smith

(10) Patent No.: US 8,881,646 B2
(45) Date of Patent: Nov. 11, 2014

(54) CONVEYORIZED BAKING OVEN WITH STEAM TUNNEL

(75) Inventor: Stephen R. Smith, Tucker, GA (US)

(73) Assignee: Baking Technology Systems, Inc., Tucker, GA (US)

( * ) Notice: Subject to any disclaimer, the term of this patent is extended or adjusted under 35 U.S.C. 154(b) by 454 days.

(21) Appl. No.: 13/211,621

(22) Filed: Aug. 17, 2011

(65) Prior Publication Data

US 2012/0042785 A1    Feb. 23, 2012

Related U.S. Application Data

(60) Provisional application No. 61/374,813, filed on Aug. 18, 2010.

(51) Int. Cl.
- *A21B 1/48* (2006.01)
- *A47J 37/00* (2006.01)
- *A21B 3/04* (2006.01)

(52) U.S. Cl.
CPC .... *A21B 3/04* (2013.01); *A21B 1/48* (2013.01)
USPC ............... 99/479; 99/477; 99/474; 126/21 A; 126/20; 219/401; 219/400; 426/510

(58) Field of Classification Search
USPC ....... 99/477, 478, 479, 473, 474, 516, 443 C; 126/21 A, 20, 369; 219/401, 400; 426/510, 476

See application file for complete search history.

(56) References Cited

U.S. PATENT DOCUMENTS

| | | | |
|---|---|---|---|
| 4,836,360 A | 6/1989 | Kasik | |
| 4,945,825 A | 8/1990 | Florindez | |
| 4,972,941 A | 11/1990 | Kasik | |
| 5,056,654 A | 10/1991 | Kasik | |
| 5,133,447 A | 7/1992 | Florindez | |
| 5,147,033 A | 9/1992 | Kasik | |
| 5,243,962 A * | 9/1993 | Hwang | 126/21 A |
| 5,404,782 A | 4/1995 | Ryan et al. | |
| RE35,259 E * | 6/1996 | Williams | 126/369 |
| 5,579,897 A | 12/1996 | Kasik | |
| 5,649,619 A | 7/1997 | Kasik | |
| 5,817,361 A | 10/1998 | Campbell et al. | |
| 5,871,084 A | 2/1999 | Kasik | |
| 5,942,142 A * | 8/1999 | Forney et al. | 219/388 |
| 6,572,911 B1 * | 6/2003 | Corcoran et al. | 426/510 |
| 6,629,493 B1 * | 10/2003 | Schaible et al. | 99/352 |

* cited by examiner

*Primary Examiner* — Reginald L Alexander
(74) *Attorney, Agent, or Firm* — Gardner Groff Greenwald & Villanueva, PC

(57) ABSTRACT

A system and method for applying steam to baked products in a conveyorized oven. A steam tunnel sub-enclosure includes exhaust ducts collecting steam at the conveyor's entrance and exit thereof to prevent steam from being released into the rest of the oven where it might interfere with ignition control equipment.

17 Claims, 4 Drawing Sheets

US 8,881,646 B2

CONVEYORIZED BAKING OVEN WITH STEAM TUNNEL

CROSS-REFERENCE TO RELATED APPLICATION

This application claims the benefit of U.S. Provisional Patent Application Ser. No. 61/374,813, filed Aug. 18, 2010; which application is incorporated herein by reference in its entirety for all purposes.

TECHNICAL FIELD

The present invention relates generally to the field of commercial baking equipment, and more particularly to a baking oven having a conveyor system passing through a steam tunnel or chamber.

BACKGROUND OF THE INVENTION

It has been found that certain bread products such as rye breads, hard rolls, bagels and other baked goods develop a desirable crust shine if the loaves of proofed dough are treated with steam at the beginning of the baking process. However, significant levels of steam within a typical commercial baking oven can interfere with proper operation of the flame rectification ignition control systems, causing the oven's gas burners to shut down and thereby disrupt the baking process.

Accordingly, it can be seen that needs exist for improved baking systems allowing application of steam to products baked therein. It is to the provision of improved baking systems meeting these and other needs that the present invention is primarily directed.

SUMMARY OF THE INVENTION

In example embodiments, the present invention provides a conveyorized baking oven having a steam tunnel or chamber through which a portion of the conveyor passes, to apply steam during the baking process. Exhaust controls are provided to prevent release of significant amounts of steam from the steam tunnel or chamber into the oven enclosure where it might otherwise interfere with operation of the oven burners' ignition control systems.

In one aspect, the present invention relates to a baking system including an oven defining an overall enclosed heated space therein, and also including a steam tunnel within the overall enclosed heated space. The system further includes at least one steam delivery conduit for releasing steam into the steam tunnel, and at least one steam exhaust conduit for discharging steam from the steam tunnel and preventing release of steam out of the steam tunnel into the surrounding enclosed heated space of the oven.

In another aspect, the invention relates to a steam delivery and exhaust system for a baking system, including a steam tunnel sub-enclosure, at least one steam delivery conduit, and at least one steam exhaust conduit, whereby steam is delivered into the steam tunnel sub-enclosure from the at least one steam delivery conduit, and is discharged from the steam tunnel sub-enclosure through the at least one steam exhaust conduit.

In still another aspect, the invention relates to a method of application of steam to baked products, the method including delivery of steam into a steam tunnel sub-enclosure within an overall oven enclosure, application of the steam to products conveyed through the sub-enclosure, and exhausting the steam from the sub-enclosure to prevent the steam from escaping the sub-enclosure into the surrounding overall oven enclosure to a degree which would interfere with operation of associated oven ignition control systems.

These and other aspects, features and advantages of the invention will be understood with reference to the drawing figures and detailed description herein, and will be realized by means of the various elements and combinations particularly pointed out in the appended claims. It is to be understood that both the foregoing general description and the following brief description of the drawings and detailed description of the invention are exemplary and explanatory of preferred embodiments of the invention, and are not restrictive of the invention, as claimed.

DETAILED DESCRIPTION OF EXAMPLE EMBODIMENTS

The present invention may be understood more readily by reference to the following detailed description of the invention taken in connection with the accompanying drawing figures, which form a part of this disclosure. It is to be understood that this invention is not limited to the specific devices, methods, conditions or parameters described and/or shown herein, and that the terminology used herein is for the purpose of describing particular embodiments by way of example only and is not intended to be limiting of the claimed invention. Any and all patents and other publications identified in this specification are incorporated by reference as though fully set forth herein.

Also, as used in the specification including the appended claims, the singular forms "a," "an," and "the" include the plural, and reference to a particular numerical value includes at least that particular value, unless the context clearly dictates otherwise. Ranges may be expressed herein as from "about" or "approximately" one particular value and/or to "about" or "approximately" another particular value. When such a range is expressed, another embodiment includes from the one particular value and/or to the other particular value. Similarly, when values are expressed as approximations, by use of the antecedent "about," it will be understood that the particular value forms another embodiment.

Figure 1A:
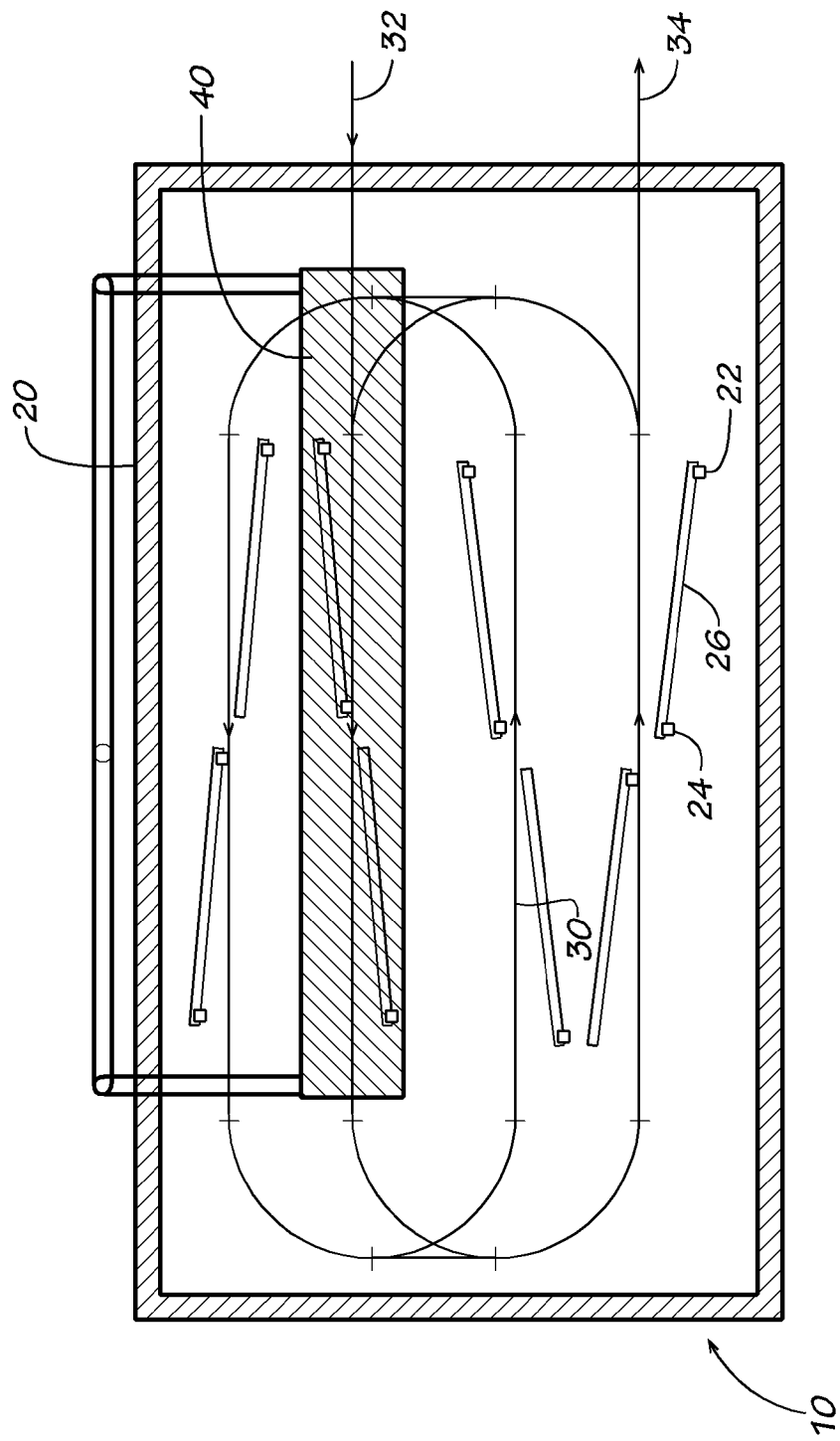
FIG. 1A is a plan view of a baking system according to an example embodiment of the present invention.
Figure 1B:
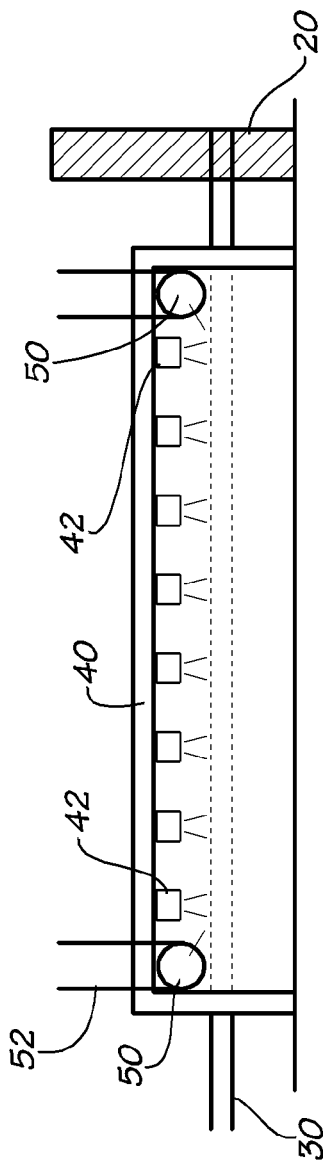
FIG. 1B is a side view of the steam tunnel portion of the baking system shown in FIG. 1A.
Figure 1C:
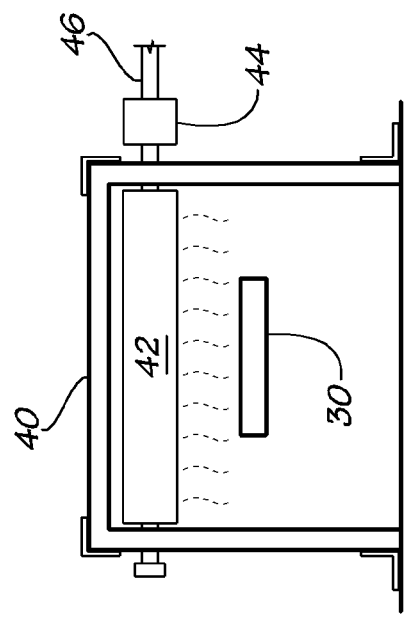
FIG. 1C is an end view of the steam tunnel portion of the baking system shown in FIG. 1A.

With reference now to the drawing figures, wherein like reference numbers represent corresponding parts throughout the several views, FIGS. 1A, 1B and 1C show a baking system 10 according to an example form of the invention. A baking oven enclosure 20 surrounds an enclosed space which is heated by gas burners or other heat source(s) in typical fashion. The baking system optionally further includes a flame rectification ignition control system having one or more flame sensors 22, ignitors 24, valves and/or controllers associated therewith for controlling ignition and/or fuel delivery to one or more burners 26 of the oven. A conveyor 30 transports products to be baked from a conveyor entrance 32 through the oven enclosure, about a conveyor path through the enclosed space in the oven, and exits through a conveyor exit 34.

A steam tunnel or chamber 40 is positioned within the enclosed space of the oven enclosure, comprising for example a sub-enclosure or duct formed of stainless steel sheet metal. Steam is delivered into the steam tunnel 40 from a boiler or other source through one or more steam headers 42, and is discharged within the sub-enclosure of the steam tunnel through discharge openings or jets. Optionally, a steam manifold 44 receives steam from an inlet conduit 46 and distributes the steam to a plurality of steam headers 42 spaced throughout the steam tunnel 40 for more even application of steam within the tunnel.

Steam exhaust ducts 50 are preferably provided over and/or around the entrance and exit of the steam tunnel 40 to collect steam and discharge it through steam exhaust headers 52, to prevent the steam from exiting the steam tunnel into the remainder of the baking oven enclosure where it might interfere with proper operation of the oven's flame rectification ignition control systems. One or more blowers, fans or other motive means are preferably included in the steam exhaust system. Optionally, flow control or containment barriers such as one or more flap, shutter, panel or door structures are provided at or adjacent the entrance and exit of the steam tunnel to allow passage of products therethrough, but limit the passage of steam out of the steam tunnel into the remainder of the oven chamber. The exhaust steam is discharged to the external atmosphere, or optionally is recirculated back to the boiler and/or the steam supply headers.

Figure 2:
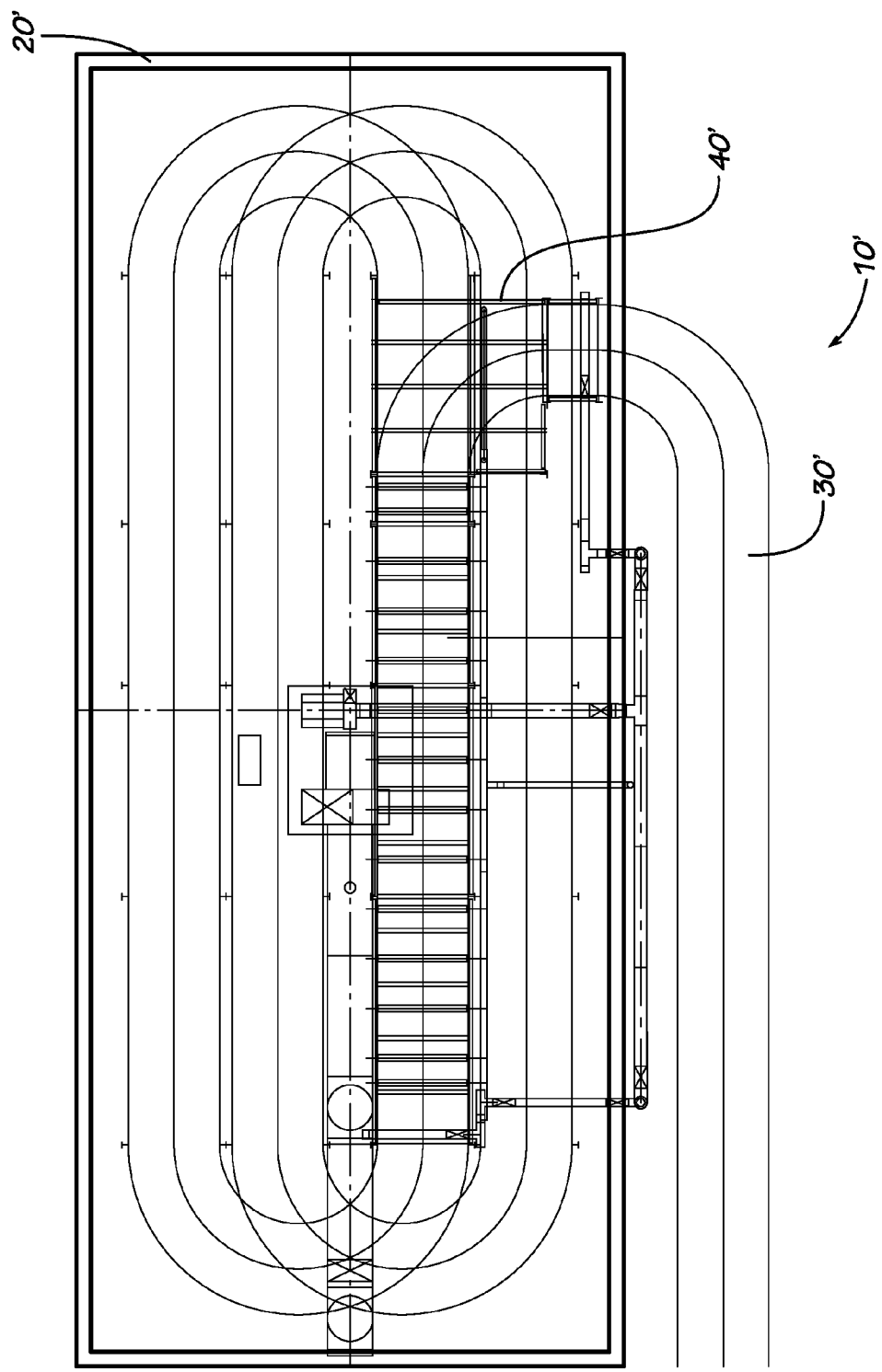
FIG. 2 shows a baking system according to another example embodiment of the present invention.
Figure 3:
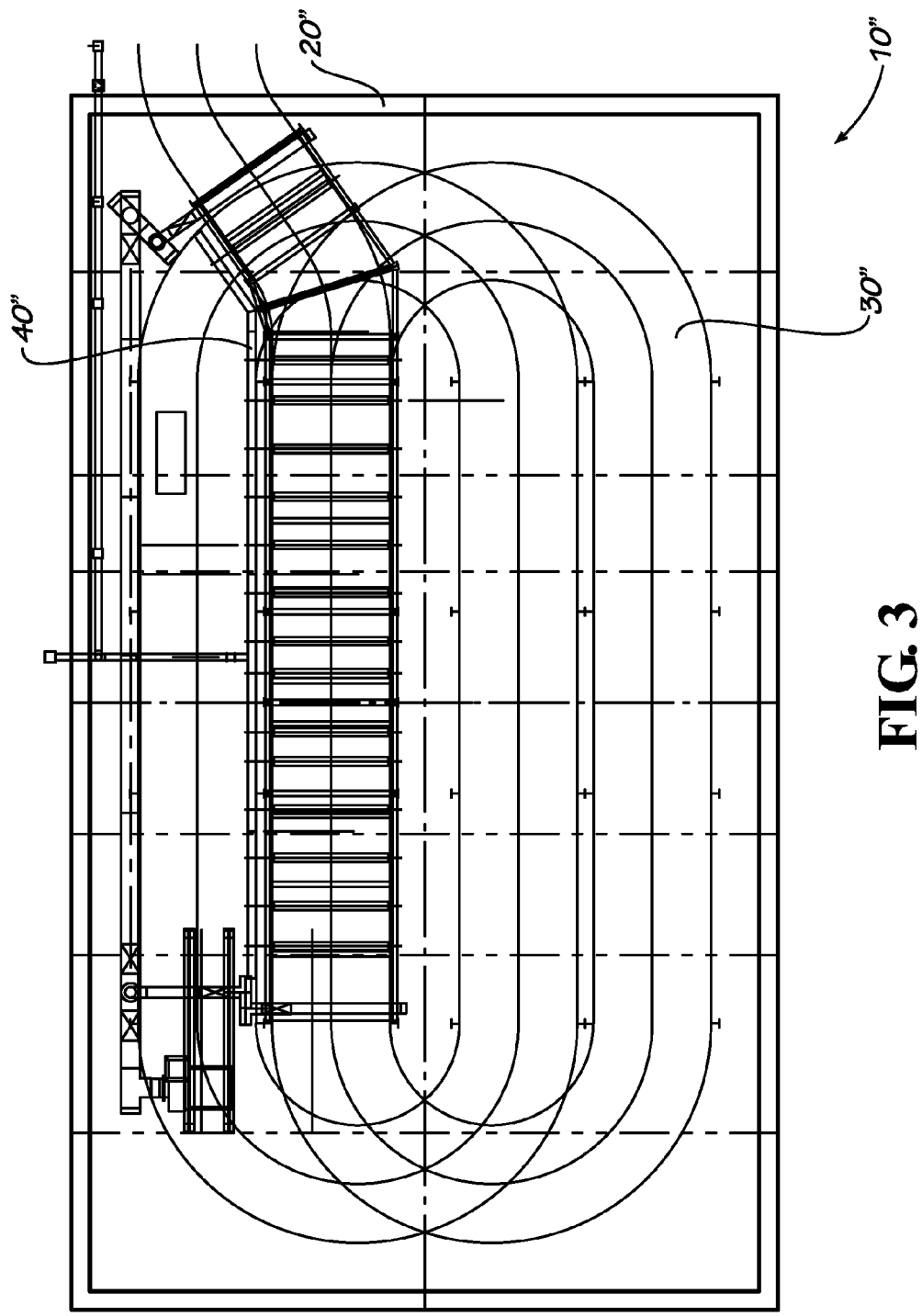
FIG. 3 shows a baking system according to another example embodiment of the present invention.

FIGS. 2 and 3 show alternate embodiments of baking systems 10', 10", having similar components to the above-described embodiment, indicated respectively with prime (') and double prime (") symbols. The system of the present invention can be implemented by retrofitting a steam tunnel arrangement with steam supply and exhaust, substantially as described above, to an existing baking oven, or alternatively can be provided as original equipment as part of a newly constructed baking oven. Accordingly, the invention further comprehends a retrofit kit including a steam tunnel sub-enclosure, steam supply conduit(s), steam exhaust conduit(s) and blower(s), substantially as described.

In use, the system of the present invention enables a method of application of steam to baked products without interfering with the proper operation of an oven's flame rectification ignition control systems. Steam is delivered into a steam tunnel sub-enclosure within the overall oven enclosure, and applied to products conveyed through the sub-enclosure. Steam is collected and exhausted from the sub-enclosure over and/or around the entrance and exit of the conveyor through the sub-enclosure, to prevent discharge of steam from the sub-enclosure to the surrounding oven enclosure.

While the invention has been described with reference to preferred and example embodiments, it will be understood by those skilled in the art that a variety of modifications, additions and deletions are within the scope of the invention, as defined by the following claims.

What is claimed is:

1. A baking system comprising an oven defining an overall enclosed heated space therein, and further comprising a steam tunnel within the overall enclosed heated space, the system further comprising at least one steam delivery conduit for releasing steam into the steam tunnel, and at least one steam exhaust conduit for discharging steam from the steam tunnel and restricting release of steam out of the steam tunnel into the surrounding enclosed heated space of the oven, wherein at least a portion of the exhaust steam collected by the at least one steam exhaust conduit is recirculated back though a steam recirculation conduit to the at least one steam delivery conduit.

2. The baking system of claim 1, further comprising a conveyor for transporting products through the oven, at least a portion of the conveyor passing through the steam tunnel.

3. The baking system of claim 2, wherein the conveyor carries the products along a conveyor path from a conveyor entrance into the enclosed heated space to a conveyor exit from the enclosed heated space, a first portion of the conveyor path being within the steam tunnel and a second portion of the conveyor path being within enclosed heated space but outside of the steam tunnel.

4. The baking system of claim 1, further comprising an ignition control system, the steam tunnel containing the steam to an extent sufficient to prevent interference with operation of the ignition control system in use.

5. The baking system of claim 1, wherein the at least one steam delivery conduit comprises a steam manifold distributing steam to a plurality of steam headers spaced throughout the steam tunnel.

6. The baking system of claim 5, wherein the steam headers each comprise at least one steam jet for controlling the release of steam therefrom.

7. The baking system of claim 1, wherein the steam tunnel comprises an entrance and an exit, and wherein a first one of the at least one steam exhaust conduits is proximal the steam tunnel entrance and a second one of the at least one steam exhaust conduits is proximal the steam tunnel exit.

8. A steam delivery and exhaust system for a baking system, comprising a steam tunnel sub-enclosure, at least one steam delivery conduit, and at least one steam exhaust conduit, whereby steam is delivered into the steam tunnel sub-enclosure from the at least one steam delivery conduit, and is discharged from the steam tunnel sub-enclosure through the at least one steam exhaust conduit, wherein at least a portion of the exhaust steam collected by the at least one steam exhaust conduit is recirculated back though a steam recirculation conduit to the at least one steam delivery conduit.

9. The steam delivery and exhaust system of claim 8, further comprising a conveyor for transporting products through the steam tunnel sub-enclosure.

10. The steam delivery and exhaust system of claim 8, wherein the at least one steam delivery conduit comprises a steam manifold distributing steam to a plurality of steam headers spaced throughout the steam tunnel sub-enclosure.

11. The steam delivery and exhaust system of claim 10, wherein the steam headers each comprise at least one steam jet for controlling the release of steam therefrom.

12. The steam delivery and exhaust system of claim 8, wherein the steam tunnel sub-enclosure comprises an entrance and an exit, and wherein a first one of the at least one steam exhaust conduits is proximal the steam tunnel entrance and a second one of the at least one steam exhaust conduits is proximal the steam tunnel exit.

13. A method of application of steam to baked products, the method comprising delivery of steam into a steam tunnel sub-enclosure within an overall oven enclosure, application of said steam to products conveyed through the sub-enclosure, and exhausting said steam from the sub-enclosure to prevent said steam from escaping the sub-enclosure into the surrounding overall oven enclosure to a degree which would interfere with operation of associated oven ignition control systems, and further comprising recirculating at least a portion of the steam exhausted from the steam tunnel sub-enclosure back though a steam recirculation conduit into the steam tunnel sub-enclosure.

14. The method of application of steam to baked products of claim 13, further comprising transporting the baked products through the steam tunnel sub-enclosure on a conveyor.

15. The method of application of steam to baked products of claim 14, comprising transporting the baked products along a first portion of a conveyor path within the steam tunnel sub-enclosure, and transporting the baked products along a second portion of the conveyor path outside of the steam tunnel sub-enclosure but within the surrounding overall oven enclosure.

16. The method of application of steam to baked products of claim 13, further comprising distributing steam within the steam tunnel sub-enclosure via a steam manifold and a plurality of steam headers spaced throughout the steam tunnel sub-enclosure.

17. The method of application of steam to baked products of claim 13, wherein the steam tunnel sub-enclosure comprises an entrance and an exit, and wherein the steam is exhausted from the steam tunnel sub-enclosure by steam exhaust conduits proximal the entrance and the exit.

\* \* \* \* \*